United States Patent
Lee et al.

(10) Patent No.: US 8,667,026 B1
(45) Date of Patent: Mar. 4, 2014

(54) METHOD AND SYSTEM FOR RANKING MULTIPLE DATA SOURCES

(75) Inventors: Young Choon Lee, Monroe, NJ (US); Oliver Winslow Selwyn, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 459 days.

(21) Appl. No.: 12/358,091

(22) Filed: Jan. 22, 2009

(51) Int. Cl.
*G06F 17/30* (2006.01)
(52) U.S. Cl.
USPC .......................................................... 707/802
(58) Field of Classification Search
USPC .......................... 707/690, 692, 749, 756, 802
See application file for complete search history.

(56) References Cited

U.S. PATENT DOCUMENTS

2004/0107189 A1* 6/2004 Burdick et al. .................... 707/3
2007/0162445 A1* 7/2007 Scriffignano et al. ............. 707/6

* cited by examiner

*Primary Examiner* — Huawen Peng
(74) *Attorney, Agent, or Firm* — Snell & Wilmer L.L.P.

(57) ABSTRACT

A method of ranking a plurality of regulated data sources and a plurality of non-regulated data sources for a data field is provided. The method evaluates consistency and assigns a ranking for a regulated data source based upon records having identical values and records having non-identical values for the data field in the regulated data source compared to other regulated data sources under analysis. The method further evaluates consistency and assigns a ranking for a non-regulated data source based upon records having identical values compared to other non-regulated data sources under analysis.

18 Claims, 4 Drawing Sheets

METHOD AND SYSTEM FOR RANKING MULTIPLE DATA SOURCES

BACKGROUND

1. Field of the Invention

The present invention generally relates to ranking multiple data sources, and more particularly, to a methods, systems and machine-readable mediums for ranking multiple regulated and non-regulated data sources.

2. Description of the Related Art

In information sharing and processing environments, many applications have been developed to process information for purposes such as making a decision or evaluating the information based on one or more criteria. In many cases, the reliability of these applications is often limited by their ability to reliably acquire accurate information. For example, acquiring accurate customer information is important for businesses to serve their customers efficiently. The customer information includes, for example, various data elements like demographic information such as postal address, age, year of birth, and customer history such as credit history or purchase history. The evolution of distributed network environments (such as the Internet) has resulted in an explosion of both the quantity and availability of the customer information from various sources. These data sources can be regulated data sources (e.g., credit bureaus, consumer reporting agencies) or non-regulated data sources (e.g., banks, mortgage issuers, credit union lenders, property lease information repositories, and customer surveys conducted by various business units). The regulated data sources are often considered more accurate and more reliable compared to the non-regulated data sources. Many organizations rely on a single data source to get the customer information. The problem with this approach is that different data sources may have different accuracies for different segments of customers. For example, different data sources may have different accuracies based on geographical locations. In particular, Equifax® may present more accurate data for the Eastern states of the USA, while Experian may present more accurate data for the Western states of the USA. Further, different data sources may have different accuracies in different demographic groups. For example, mortgage bank repositories may provide more accurate data for customers aged 50 and above, but not for customers aged between 20 and 30.

To overcome this problem, some organizations use multiple data sources, and rely on a priority order of the data sources prepared by their employees to select customer information. Unavailability of customer information at a high priority data source may prompt the use of customer information available from a lower priority data source. The employees manually assess various data sources to prioritize the data sources for selecting customer information. Such assessment may involve historic accuracy of the data source, or a control set of records from the data source, verified with the customers themselves. For example, a manual assessment of the accuracy of date of birth information obtained from various data sources based on a sample set of customers. The problem with this approach is that this fails to provide a true representation of all the data. Moreover, it is difficult to handle a large volume of data using the manual process and data verification with the customers themselves.

Therefore, a long felt need exists for a method and system that overcomes these and other problems associated with current techniques to determine the most reliable data source and data sources with lower reliability.

SUMMARY

A method and system for ranking multiple data sources based on the data sources consistency with said other is provided. Statistical analysis shows that consistent customer information available at multiple data sources is more reliable as compared to inconsistent customer information from a particular data source. The data sources having customer information consistent with other data sources are considered more reliable than the data sources having customer information inconsistent with the other data sources. In one embodiment, the system for ranking multiple data sources processes sets of records obtained from multiple regulated and non-regulated data sources, and ranks the multiple regulated data sources and non-regulated data sources in order of consistency with other data sources. The system for ranking multiple data sources ranks data sources based on a particular data field such as "year of birth", "permanent address", "age of the customer" and the like.

In one embodiment, a data source ranking module evaluates a count of overlapping records in said regulated data source having identical customer information in at least one other regulated data source. For said regulated data source under consideration, the count of unique-only records having customer information different from corresponding records of the other regulated data sources is also evaluated by the data source ranking module. The data source ranking module ranks the regulated data sources based on the difference of the count of overlapping records and the count of unique-only records, calculated for said of the regulated data sources.

In an embodiment, a data source ranking module evaluates the count of overlapping records in said non-regulated data source under consideration where customer information is identical in all of the regulated data sources 120. The data source ranking module ranks the non-regulated data sources based on the count of overlapping records in said non-regulated data source having identical values in the corresponding records of the overlap set. The data source ranking module may be implemented as application software. In alternate embodiments the data source ranking module may be implemented as a function or sub-routine of a computer program, or as a program of a suite of applications.

The multiple regulated data sources and non-regulated data sources may be ranked separately for different data fields including without limitation, demographic data such as "year of birth", "age of customer" or "annual income" and geographic data such as "permanent address" or "state of residence".

The data source rankings may be used by business units to make accurate business decisions such as targeted advertising or risk assessment.

BRIEF DESCRIPTION OF DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

Figure 1:
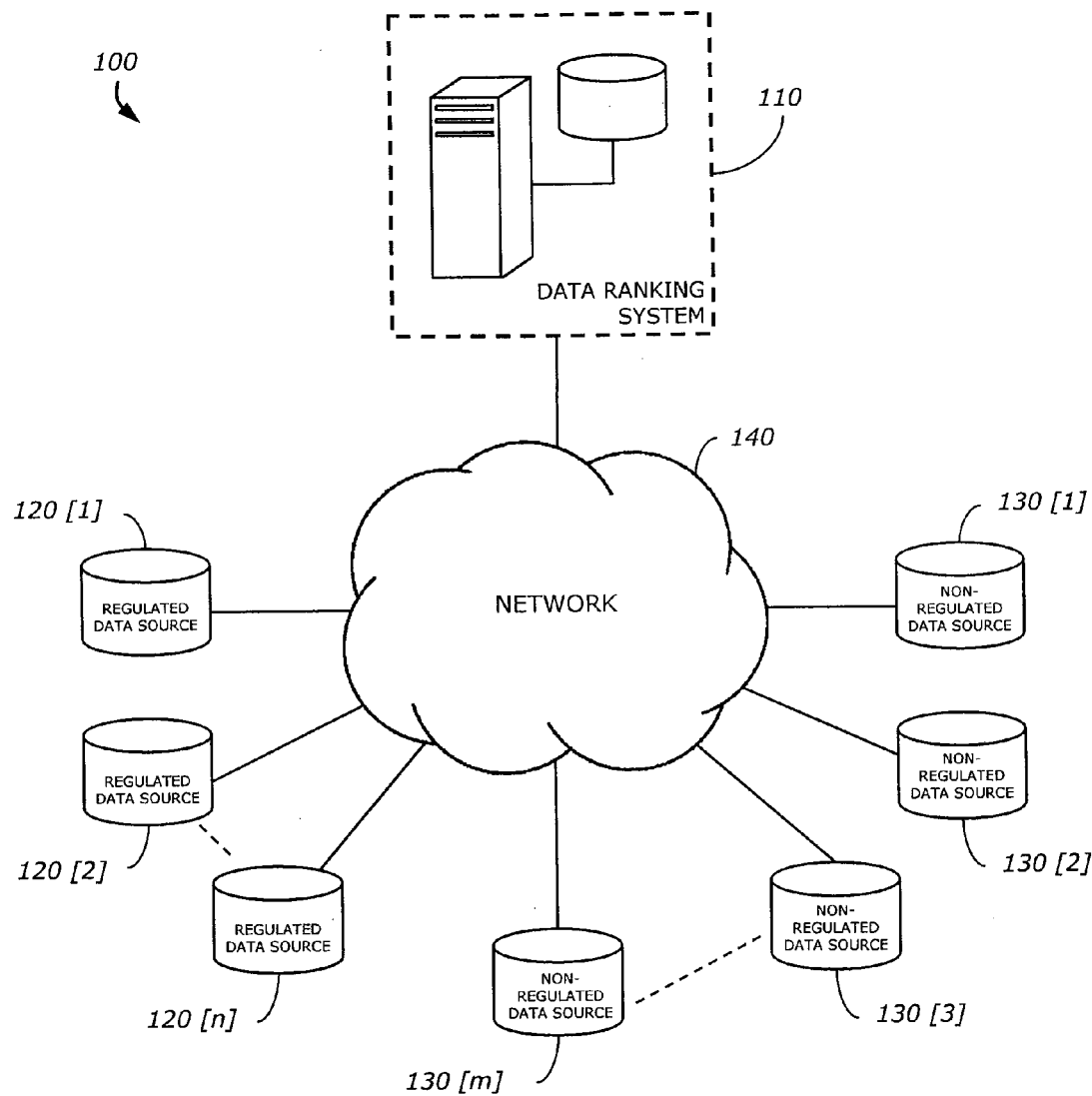
FIG. 1 is a diagram illustrating a representative system for implementing a method for ranking multiple data sources in accordance with one embodiment of the invention.

The detailed description of embodiments of the invention makes reference to the accompanying drawings, which show embodiments by way of illustration and its best mode. While these embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The benefits provided by this invention include, for example, providing organizations with accurate and reliable data, decreasing costs associated with verifying and validating customer data, increasing the ability to design products and promotions for an appropriate subset of customers and decreasing data errors that may result in customer dissatisfaction and/or legal or regulatory issues.

Data source includes a database or other data source that stores data. A data source may be a regulated data source or a non-regulated data source.

Data element or data field includes a subset of a data source (e.g. a position in a dataset or a column in a database) configured to store a particular type of information.

Record includes a subset of a data source configured to store data related by one or more factors (e.g. a row on a dataset or a database that includes information for a particular customer).

Customer includes an individual, consumer, group, business, organization, government entity, transaction account issuer or processor (e.g., credit, charge, etc), merchant, consortium of merchants, account holder, charitable organization, software, hardware, and/or any other entity.

Customer information or raw data values (RDVs) includes the value of a data element in a data source. In one embodiment, an RDV is associated with a customer. The data record of the customer may have one or more data elements such as "year of birth", "permanent address", "zip code" or "age" of the customer. Examples of customer information include "1965", "123 MAIN STREET, PHOENIX AZ", "40501" or "43" for the "year of birth", "permanent address", "zip code" and "age" data elements, respectively.

Overlapping data records include data records in a data source having customer information identical to the corresponding records (e.g. corresponding to the same customer) of at least one other data source. In one embodiment, customer information may be normalized to conform to a standard format of the data field. The customer information may be compared to customer information in corresponding data records of other data sources. In case a match is found, the data record is marked as an overlapping data record.

Unique-only data records include data records in a data source not having identical customer information in the corresponding data records of any other data source. In one embodiment, customer information may be normalized to conform to a standard format of the data field. The customer information may be compared to customer information in corresponding data records of the other data sources. In cases where no match is found, the data records are marked as unique-only data records.

FIG. 1 illustrates a system 100 for implementing a method for ranking multiple data sources according to one embodiment of the invention. System 100 includes a data source ranking system 110, one or more regulated data sources 120 [1], 120 [2], 120 [3] . . . 120 [$n$], one or more non-regulated data sources 130 [1], 130 [2], 130 [3] . . . 130 [$m$], and a network 140. Data source ranking system 110 includes a computing device in communication with the regulated data sources 120 and non-regulated data sources 130, through network 140. One skilled in the art will appreciate that network 140 may include any communication channel for exchanging data, such as the Internet, an intranet, an extranet, local area network (LAN), wide area network (WAN), satellite or wireless communications, and/or the like. In various embodiments, network 140 is a packed switched network that transmits data in form of segments called packets.

Data source ranking system 110 obtains customer information from various regulated data sources 120 and non-regulated data sources 130. Data source ranking system 110 ranks the regulated data sources 120 and the non-regulated data sources 130 in order of their consistency with the regulated data sources 120. An implementation of data source ranking system 110 is explained below in conjunction with FIG. 2. Data source ranking system 110 may be deployed at a service provider that uses customer information directly. In one embodiment, data source ranking system 110 may be implemented by a third party service provider that licenses the customer information to other service providers.

Data source ranking system 110 obtains customer information from various regulated data sources 120 and various non-regulated data sources 130. Data source ranking system 110 may obtain customer information through a packet switched network 140 and/or from secondary storage media such as optical discs, solid state memory or portable magnetic memory. Regulated data sources 120 include data sources that are regulated by a governing body or a third party provide assurance for the accuracy of values of the data elements. In various embodiments of the invention, the regulated data sources 120 are credit bureaus that collect and collate personal information, financial data, and alternative data on individuals from a variety of sources called data furnishers. The credit bureaus include, for example, TransUnion$^{SM}$, Experian and Equifax®. The data furnishers are typically creditors, lenders, utilities, debt collection agencies and the courts that a consumer has had proceedings with. The data provided by the data furnishers as well as collected by the credit bureaus is aggregated into the credit bureau's database. In the United States, government bodies share responsibility for the oversight of credit bureaus and those that furnish data to them. For example, the Federal Trade Commission (FTC) has oversight for the credit bureaus while the Office of the Comptroller of the Currency (OCC) charters, regulates national banks with regard to the data they furnish the credit bureaus. Those skilled in the art will appreciate that steps of the invention may apply to various regulated data sources of various countries including, without limitation, Experian, Equifax® and Callcredit of United Kingdom, and the like.

Non-regulated data sources 130 include data sources that are typically not regulated by a governing body or a third party. The non-regulated data sources 130 include property lease records, individual mortgage issuers, banks, credit union lenders, and the like. Many business organizations rely more on regulated data sources 120 for customer information (e.g. the values of the data elements). For example, a bank may consider a birth year provided by Equifax® more reliable compared to birth year data provided by an individual mortgage issuer. Thus, regulated data sources 120 may be ranked higher than the non-regulated data sources 130. The ranking process performed by data source ranking system 110 is explained in conjunction with FIG. 4.

Figure 2:
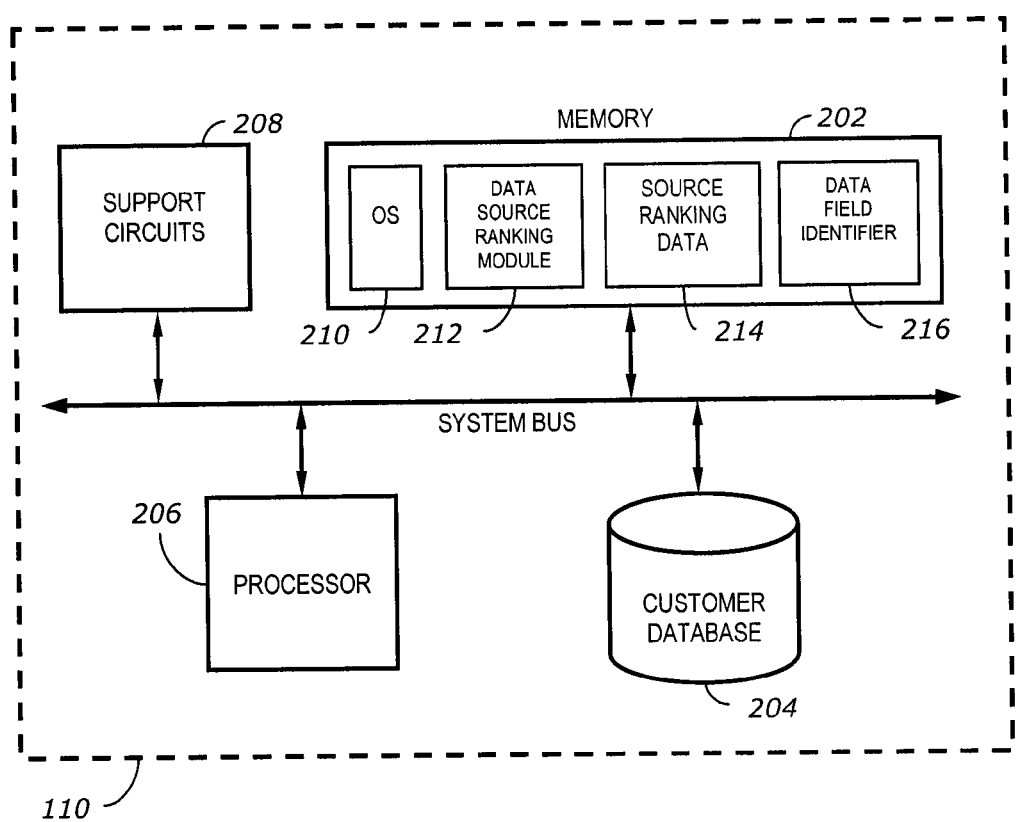
FIG. 2 is a simplified block diagram of a representative data source ranking system illustrated in FIG. 1 in accordance with one embodiment of the invention.

FIG. 2 is a simplified block diagram of an exemplary implementation of data source ranking system 110. Data source ranking system 110 includes a memory 202, a customer database 204, a processor 206 and support circuits 208. Memory 202 coupled to the customer database 204, includes a plurality of computer readable mediums accessible by the processor 206. The plurality of computer readable mediums include an operating system (OS) 210, a data source ranking module 212 and source ranking data 214. Data source ranking module 212 ranks regulated data sources 120 and non-regulated data sources 130 based on customer information obtained from customer database 204. A person skilled in the art would appreciate that memory 202 may include dynamic or static random access memory, magnetic or optical data storage disks, or magnetic data storage tapes, and the like. Other processing and memory means, including various computer readable media, may be used for storing and executing program instructions. OS 210 may comprise various executable application modules. Data source ranking module 212 may be implemented as a machine-readable program code that is executable on processor 206. In various embodiments, data source ranking module 212 may be implemented as a function or sub-routine of a machine-readable medium, or as a machine-readable medium of a suite of applications. The machine-readable medium includes a series of computer instructions that are designed to accomplish a particular result.

Source ranking data 214 includes ranking data associated with regulated data sources 120 and non-regulated data sources 130. In various embodiments of the invention, source ranking data 214 may further include other measures of data source reliability such as, without limitation, percentage reliability, a numeric value within a specified range or a ratio. Data source ranking module 212 ranks the data sources and provides the source ranking data 214. In one embodiment, the source ranking data 214 may have separate rankings for separate fields of the regulated data sources 120 and non-regulated data sources 130. In an embodiment, the source ranking data 214 may have different rankings for different demographics. For example, data source ranking module 212 may rank regulated data sources 120 and non-regulated data sources 130 separately based on parameters such as demographic data of customers and geographic location of customers. A person skilled in the art will appreciate that rankings may be generated using other parameters, such as age, community, etc.

Memory 202 includes a data field identifier 216 to store the data field, according to which regulated data sources 120 and non-regulated data sources 130 are ranked. In one embodiment, a user provides data field identifier 216 through a remote node connected to the data source ranking system 110.

In an embodiment, an application requesting data source rankings 206 provides data field identifier 216 while in one embodiment the data field identifier 216 may automatically be generated by the data source ranking system 110 for all available data fields, in sequence, to rank the various data sources according to all fields sequentially.

Customer database 204 includes customer information obtained from regulated data sources 120 and the non-regulated data sources 130. In one embodiment, customer database 204 is implemented in memory 202. In an embodiment, customer database 204 may be implemented on secondary storage devices such as magnetic discs, optical discs or solid state non-volatile memories. Customer database 204 may be implemented using commonly know database management techniques including, without limitation, Oracle®, Microsoft® SQL Server, or MySQL®.

The tsaidings of the present invention may be embodied in the form of computer readable program code that is executable on processor 206. Processor 206 executes process steps associated with data source ranking module 212. Processor 206 includes at least one microprocessor or microcontroller. Though a single processor is shown in FIG. 2, a person skilled in the art will recognize that data source ranking system 110 may include multiple processors. Support circuits 208 include well-known circuits that support the operation of processor 206 such as power supplies, clocks, cache, input/output circuits, network cards, and the like. Support circuits 208 include circuitry for communication with network 140 such as a modem, a router, an Ethernet adaptor, and the like. Support circuits 208 may also include other communication interfaces such as Institute of Electrical and Electronics Engineers (IEEE) 1394, IEEE 802.11 (Wireless LAN), RS232 serial port, or Universal Serial Bus (USB).

Data source ranking system 110 executes the data source ranking module 212 using data from the customer database 204 to rank various regulated data sources 120 and non-regulated data sources 130. Data source ranking module 212 ranks these data sources in order of their consistency with the regulated data sources 120. In one embodiment, data source ranking module 212 analyses the customer information stored in customer database 204 one field at a time. For example, data source ranking module 212 analyses "year of birth" information from regulated data sources 120 and non-regulated data sources 130, for ranking the data sources in order of consistency of "year of birth" information. Data source ranking module 212 may be executed separately for other fields of the data sources such as "credit rating", "annual income", "age" or "permanent address". In one embodiment, regulated data sources 120 and non-regulated data sources 130 are ranked for all fields sequentially. In an embodiment, the regulated data sources 120 and the non-regulated data sources are ranked for a subset of the data fields, e.g. the data fields associated with subsequent processing of the customer information.

Regulated data sources 120 and non-regulated data sources 130 are ranked in separate sub-processes of the data source ranking module 212. A person skilled in the art will recognize that the sub-processes may be different applications capable of being run independently, or sub-routines or functions of the same application.

In one embodiment of a sub-process for ranking regulated data sources 120, data source ranking module 212 evaluates a count of overlapping records in said regulated data source 120 having identical customer information in at least one other regulated data source 120. For said regulated data source 120 under consideration, the count of unique-only records having customer information different from corresponding records of other regulated data sources 120 is also evaluated by data source ranking module 212. Data source ranking module 212 ranks the regulated data sources 120 based on the difference of the count of overlapping records and the count of unique-only records, calculated for said of the regulated data sources.

In a representative sub-process for ranking non-regulated data sources 130 data source ranking module 212 evaluates the count of overlapping records in non-regulated data source 130 having identical customer information in the regulated data sources 120. Data source ranking module 212 ranks non-regulated data sources 130 based on the count of overlapping records in non-regulated data source 130 having identical values in the corresponding records of the overlap set. Data source ranking module 212 may be implemented as application software. In an embodiment, data source ranking module 212 may be implemented as a function or sub-routine of a computer program, or as a program of a suite of applications. The execution of the process steps associated with data source ranking module 212 is described in conjunction with FIG. 4 below.

Figure 3:
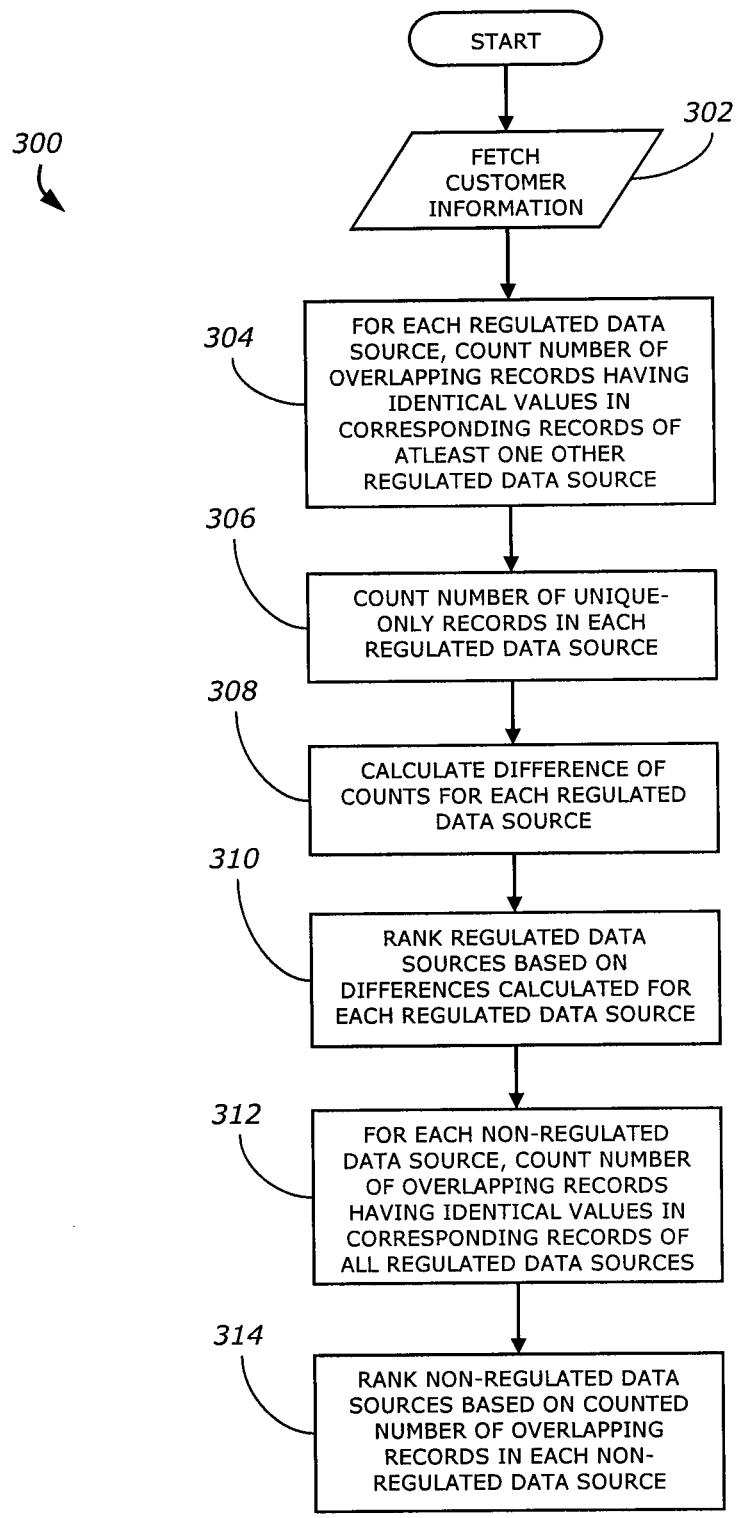
FIG. 3 is a flowchart illustrating a representative implementation of a method for ranking multiple data sources in accordance with one embodiment of the invention.

FIG. 3 is a flowchart illustrating a representative implementation of a method 300 for ranking multiple data sources in accordance with one embodiment. The flowchart illustrates process steps for ranking various regulated data sources 120 and non-regulated data sources 130 according to a data field. In one embodiment, the data field is a numeric field such as the "year of birth" of the customer. Method 300 for ranking data sources may be executed for said field sequentially. In an embodiment, method 300 for ranking data sources may be executed for said data field individually. The data source ranking system 110 accesses customer information from regulated data sources 120 and non-regulated data sources 130 and stores the customer information in customer database 204 (step 302). The data source ranking system 110 executes the data source ranking module 212 to rank the various data sources based on consistency with the other data sources, using the customer information stored in customer database 204.

As described earlier, in one embodiment regulated data sources 120 and non-regulated data sources are ranked by separate sub-processes. Although FIG. 3 illustrates a sequential execution of the sub-process for ranking regulated data sources and the sub-process for ranking non-regulated data sources, a person skilled in the art will appreciate that processes, sub-processes and individual process steps may be executed independently and in any order. Referring again to FIG. 3, data source ranking module 212 counts the number of overlapping records in said regulated data source 120, having identical customer information in the corresponding records of at least one other regulated data source 120 (step 304). Data source ranking module 212 counts unique-only records having customer information different from corresponding records of the other regulated data sources 120 (step 306).

Data source ranking module 212 calculates the difference of the count of unique-only records determined in step 306 and the count of overlapping records for said regulated data source 120 determined in the step 304 (step 308). The data source ranking module 212 then ranks regulated data sources 120 (step 310), based on the differences calculated in step 308.

Data source ranking module 212 counts the number of overlapping records in the non-regulated data sources 130 having identical customer information in the corresponding records of all regulated data sources 120 (step 312). Data source ranking module 212 ranks non-regulated data sources 130 based on the count of overlapping records in the non-regulated data source 130, determined in the step 312 (step 314).

As illustrated in the process flow of FIG. 3, regulated data sources 120 and non-regulated data sources 130 are ranked independently. In an embodiment, regulated data sources 120 are ranked higher than non-regulated data sources 130. Although, data source ranking system 110 and data source ranking module 212 rank both the regulated data sources 120 and the non-regulated data sources 130, a person skilled in the art will appreciate that according to the needs of the analysis being conducted, only the regulated data sources 120 or only the non-regulated data sources 130 may be ranked by the data source ranking system 110. In one embodiment, all available regulated data sources 120 and non-regulated data sources 130 will be ranked in the order of their consistency with the other sources. In an embodiment, the desired regulated data sources 120 and desired non-regulated data sources 130 will be selected and ranked, based on, for instance, the requirements of data analytics.

Figure 4:
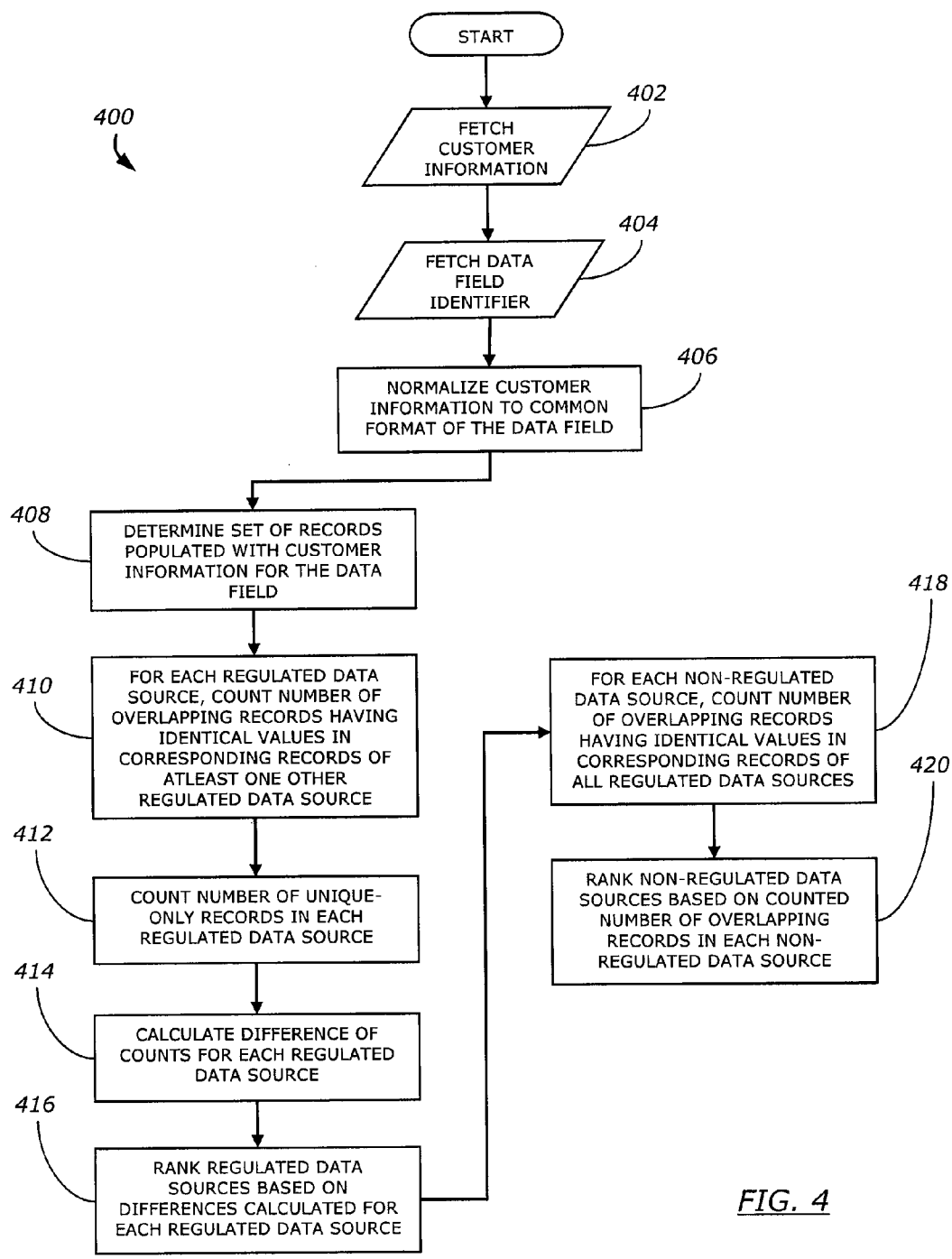
FIG. 4 is a flowchart illustrating a representative implementation of a method for ranking multiple data sources in accordance with one embodiment of the invention.

FIG. 4 is a flowchart illustrating a representative implementation of a method 400 for ranking multiple data sources in accordance with one embodiment. The flowchart illustrates process steps for ranking various regulated data sources 120 and non-regulated data sources 130 according to a data field. In one embodiment, the data field is a numeric field such as the "year of birth" of the customer. The method 400 for ranking data sources may be executed for said field sequentially. In an embodiment, the method 400 for ranking data sources may be executed for said data field individually, as desired. The data source ranking system 110 receives customer information from regulated data sources 120 and non-regulated data sources 130 and stores the customer information in customer database 204 (step 402). Regulated data sources 120 and non-regulated data sources 130 are ranked based on the customer information in a particular data field, such as "year of birth" of the customer. Thus, in one embodiment the data source rankings will contain a ranking of the data sources for said data field, e.g. a data source may be ranked highly for "year of birth" but extremely low for other data such as "credit score." Determining a ranking at the data field level enables organizations to transform individual data sources into a composite data source with the most consistent information for said data field.

The data field identifier 216 is used to identify the data field of the data sources, based on which the data sources are to be ranked. Data ranking module 212 receives data field identifier 216 (step 404) as input. In one embodiment, data field identifier 216 is received as user input. In an embodiment, data field identifier 216 is provided by a remote node connected to the data source ranking system 110. In an embodiment, an application requesting the data source rankings 206 provides the data field identifier 216. In one embodiment, the data field identifier 216 may automatically be generated by data source ranking system 110 for all available data fields, in sequence, to rank the various data sources according to the data fields sequentially.

The data source ranking system 110 normalizes the customer information in the field of the customer database 204 identified by the data field identifier 216 to a common format (step 406). The data source ranking system then executes the data source ranking module 212 to rank the various data sources based on their consistency with the other data sources, using the customer information, stored in customer database 204, in the field indicated by the data field identifier 216.

As described earlier, in one embodiment regulated data sources 120 and non-regulated data sources are ranked by separate sub-processes. Data source ranking module 212 determines an initial set of records populated with customer information for the data field indicated by the data field identifier 216 in said of the regulated data sources 120 (step 408). The initial set of records is examined for ranking the regulated data sources 120. Within the initial set of records, the data source ranking module 212 counts the number of overlapping records in said regulated data source 120, having identical customer information in the corresponding records of at least one other regulated data source 120 (step 410). Further, within the initial set of records, the data source ranking module 212 counts unique-only records having customer information different from corresponding records of the other regulated data sources 120 (step 412).

Data source ranking module 212 calculates the difference of the count of unique-only records determined in step 412 and the count of overlapping records for the regulated data sources 120 determined in the step 410 (step 414). Data source ranking module 212 ranks the regulated data sources 120 (step 416) based on the differences calculated in step 414.

Data source ranking module 212 counts the number of overlapping records in said non-regulated data source 130, having identical customer information in the corresponding records of the regulated data sources 120 (step 418). The data source ranking module 212 ranks non-regulated data sources 130 based on the count of overlapping records in said non-regulated data source 130, determined in the step 418 (step 420).

As illustrated in the process flow of FIG. 4, in one embodiment regulated data sources 120 and non-regulated data sources 130 are ranked independently. In an embodiment of the present invention, the regulated data sources 120 are ranked higher than the non-regulated data sources 130. Although, data source ranking system 110 and data source ranking module 212 rank both regulated data sources 120 and non-regulated data sources 130, a person skilled in the art will appreciate that according to the requirements of data analytics, only the regulated data sources 120 or only the non-regulated data sources 130 may be ranked by the data source ranking system 110. In one embodiment, all available regulated data sources 120 and non-regulated data sources 130 will be ranked in the order of their consistency with the other sources. In an embodiment, only the desired regulated data sources 120 and desired non-regulated data sources 130 will be selected and ranked, based on the requirements of data analytics.

In an embodiment, the customer information obtained from regulated data sources 120 and non-regulated data sources 130, and stored in customer database 204 is numeric data such as "year of birth" information of a customer. A person skilled in the art will appreciate that the data source ranking system 110 and data source ranking module 212 may be used to rank regulated data sources 120 and non-regulated data sources 130 based on fields containing text values such as customer name and/or alpha-numeric values such as permanent address. In this case, suitable text processing may be employed to determine whether customer information from multiple sources is equivalent or different. Such text processing may include without limitation parsing the customer information into words and/or characters, analyzing white spaces and punctuation marks, generating keywords for comparison and analyzing occurrence of keywords. Various third-party text comparison software is available. Such software may be configured for use with data source ranking module 212 or suitable text processing algorithms may be implemented in the data source ranking system 110.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of information structures, objects, processes, routines or other programming elements. Further, it should be noted that the present invention may employ any number of conventional techniques for information transmission, signaling, information processing, network control, and the like. Still further, the invention could be used to detect or prevent security issues with a client-side scripting language, such as Java-Script, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference for background purposes.

It will be appreciated, that many applications of the present invention could be formulated. One skilled in the art will appreciate that the network may include any system for exchanging information or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

It should be appreciated that the particular implementations shown and described herein are illustrative of the invention and its best mode and are not intended to otherwise limit the scope of the present invention in any way. Indeed, for the sake of brevity, conventional information networking, application development and other functional aspects of the systems (and components of the individual operating components of the systems) may not be described in detail herein.

Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, an information processing system, a device for information processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that said functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable information processing apparatus to produce a machine, such that the instructions which execute on the computer or other programmable information processing apparatus create means for implementing the functions specified in the flowchart block or blocks.

These computer program instructions may also be stored in a computer-readable memory that can direct a computer or other programmable information processing apparatus to function in a particular manner, such that the instructions stored in the computer-readable memory produce an article of manufacture including instruction means which implement the function specified in the flowchart block or blocks. The computer program instructions may also be loaded onto a computer or other programmable information processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that said functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims. While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, desired, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, when a phrase similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A computer implemented method, comprising:
   for a regulated data source in a plurality of regulated data sources:
      evaluating, using a computer-based system for assessing data sources, a first count of records in said regulated data source having an identical value for a first data field as at least one other record in said plurality of regulated data sources;
      evaluating, using said computer-based system, a second count of records in said regulated data source having no identical values for said first data field in said plurality of regulated data sources;
      calculating, using said computer-based system, a numerical difference of said first count and said second count;
      assigning, using said computer-based system and based on said difference, a first regulated data source ranking for said first data field for said regulated data source of said plurality of regulated data sources;
      assigning, using said computer-based system, a second regulated data source ranking for a second data field for said regulated data source;
   for a non-regulated data source in a plurality of non-regulated data sources:
      evaluating, using said computer-based system, a third count of records in said non-regulated data source having identical values for said data field and for at least one record in said regulated data source in said plurality of regulated data sources; and assigning, using said computer-based system and based on said third count, a non-regulated data source ranking for said non-regulated data source of said plurality of non-regulated data sources.

2. The method of claim 1, further comprising: converting values from said first data field of the regulated data sources and non-regulated data sources into a common format of said first data field.

3. The method of claim 1, further comprising receiving a data field identifier, wherein said data field identifier indicates said first data field for ranking said plurality of regulated data sources and said plurality of non-regulated data sources.

4. The method of claim 1, further comprising: determining an initial set of records to rank said plurality of regulated data sources and said plurality of non-regulated data sources.

5. The method of claim 4, wherein said initial set of records comprises records having a value available in said regulated data source.

6. The method of claim 5, wherein said having a value available comprises at least one of having a non-blank value, having a value that is not null, and having a value that is not empty.

7. The method of claim 4, wherein said determining said initial set of records comprises selecting a set of records based on at least one of demographic data and geographic data.

8. The method of claim 1, further comprising associating at least one of said regulated data source ranking and said non-regulated data source ranking with said first data field.

9. An article of manufacture including a non-transitory, tangible computer readable storage medium having instructions stored thereon that, in response to execution by a computer-based system for assessing data sources, cause the computer-based system to perform operations comprising:
for a regulated data source in a plurality of regulated data sources:
evaluating, by said computer-based system, a first count of records in said regulated data source having an identical value for a first data field as at least one other record in said plurality of regulated data sources;
evaluating, by said computer-based system, a second count of records in said regulated data source having no identical values for said first data field in said plurality of regulated data sources;
calculating, by said computer-based system, a numerical difference of said first count and said second count;
assigning, by said computer-based system and based on said difference, a first regulated data source ranking for said first data field for said regulated data source of said plurality of regulated data sources;
assigning, by said computer-based system, a second regulated data source ranking for a second data field for said regulated data source;
for a non-regulated data source in a plurality of non-regulated data sources:
evaluating, by said computer-based system, a third count of records in said non-regulated data source having identical values for said data field and for at least one record in said regulated data source in said plurality of regulated data sources; and
assigning, by said computer-based system and based on said third count, a non-regulated data source ranking for said non-regulated data source of said plurality of non-regulated data sources.

10. The article of manufacture of claim 9, further comprising converting, by said computer-based system, values from said first data field of said plurality of regulated data sources and said plurality of non-regulated data sources into a common format of said first data field.

11. The article of manufacture of claim 10, wherein a data field identifier indicates said first data field for ranking the plurality of regulated data sources and the plurality of non-regulated data sources.

12. The article of manufacture of claim 10, wherein said method further comprises: determining, by said computer-based system, an initial set of records to rank the plurality of regulated data sources and the plurality of non-regulated data sources, wherein said first data field of said initial set of records has a value available in said regulated data source.

13. The article of manufacture of claim 9, wherein determining the initial set of records comprises selecting a set of records based on at least one of demographic data, and geographic data.

14. A system, comprising:
a processor for assessing data sources,
a tangible, non-transitory memory configured to communicate with the processor,
the tangible, non-transitory memory having instructions stored thereon that, in response to execution by the processor, cause the processor to perform operations comprising:
for a regulated data source in a plurality of regulated data sources:
evaluating, by said processor, a first count of records in said regulated data source having an identical value for a first data field as at least one other record in said plurality of regulated data sources;
evaluating, by said processor, a second count of records in said regulated data source having no identical values for said first data field in said plurality of regulated data sources;
calculating, by said processor, a numerical difference of said first count and said second count;
assigning, by said processor and based on said difference, a first regulated data source ranking for said first data field for said regulated data source of said plurality of regulated data sources;
assigning, by said processor, a second regulated data source ranking for a second data field for said regulated data source;
for a non-regulated data source in a plurality of non-regulated data sources:
evaluating, by said processor, a third count of records in said non-regulated data source having identical values for said data field and for at least one record in said regulated data source in said plurality of regulated data sources; and
assigning, by said processor and based on said third count, a non-regulated data source ranking of said plurality of non-regulated data sources.

15. The system of claim 14, further comprising converting, by the processor, values from said first data field of the regulated data sources and non-regulated data sources into a common format of said first data field.

16. The system of claim 14, wherein a data field identifier indicates said first data field for ranking said plurality of regulated data sources and said plurality of non-regulated data sources.

17. The system of claim 14, further comprising determining, by the processor, an initial set of records to rank said plurality of regulated data sources and said plurality of non-regulated data sources, wherein said first data field of said of the initial set of records has a value available in said of the regulated data sources.

18. The system of claim 17, wherein said determining said initial set of records comprises selecting a set of records based on at least one of demographic data, and geographic data.

\* \* \* \* \*